United States Patent
Ly et al.

(10) Patent No.: US 11,882,073 B2
(45) Date of Patent: *Jan. 23, 2024

(54) TECHNIQUES FOR SIGNALING DYNAMIC CONTROL REGION FOR PRACH TRANSMISSION

(71) Applicant: QUALCOMM Incorporated, San Diego, CA (US)

(72) Inventors: Hung Ly, San Diego, CA (US); Tao Luo, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,430

(22) Filed: Jun. 20, 2022

(65) Prior Publication Data

US 2022/0329383 A1 Oct. 13, 2022

Related U.S. Application Data

(63) Continuation of application No. 16/598,807, filed on Oct. 10, 2019, now Pat. No. 11,368,271, which is a
(Continued)

(51) Int. Cl.
*H04L 5/00* (2006.01)
*H04L 5/14* (2006.01)
*H04W 72/23* (2023.01)

(52) U.S. Cl.
CPC .......... *H04L 5/0051* (2013.01); *H04L 5/0053* (2013.01); *H04L 5/1469* (2013.01); *H04L 5/14* (2013.01); *H04W 72/23* (2023.01)

(58) Field of Classification Search
CPC ... H04L 5/0051; H04L 5/0053; H04L 5/1469; H04L 5/14; H04W 72/042; H04W 74/0833; H04W 72/0446; H04W 74/004
See application file for complete search history.

(56) References Cited

U.S. PATENT DOCUMENTS 8,526,374 B2 9/2013 Damnjanovic et al.
9,699,779 B2 7/2017 Marinier et al.
(Continued)

FOREIGN PATENT DOCUMENTS

CN 102150466 A 8/2011
WO WO-2010030935 A2 3/2010
(Continued)

OTHER PUBLICATIONS

Huawei et al., "Remaining Details of SRS Avoidance", 3GPP TSG RAN WG1 Meeting #84bis, R1-162629, Busan, Korea, Apr. 11-15, 2016, pp. 1-3.
(Continued)

*Primary Examiner* — Thai Nguyen
(74) *Attorney, Agent, or Firm* — Sevan Savsa; ArentFox Schiff LLP

(57) ABSTRACT

Techniques for signaling dynamic region for PRACH transmission are described. In an aspect, the disclosure describes a method for receiving, at a user equipment (UE), an indication of a number of symbols that the UE is to use when transmitting via a physical random access channel (PRACH), and transmitting, by the UE, via the PRACH over one or more slots based on the number of symbols. In another aspect, the disclosure describes a method for generating, at a network device, an indication of a number of symbols that a UE is to use when transmitting PRACH, transmitting, by the network device, the indication to the UE. A UE and network device configuration as well as apparatuses and computer-readable medium related to these methods are also described.

20 Claims, 8 Drawing Sheets

Related U.S. Application Data continuation of application No. 16/030,453, filed on Jul. 9, 2018, now Pat. No. 10,469,229, which is a continuation of application No. 15/850,428, filed on Dec. 21, 2017, now Pat. No. 10,084,582.

(60) Provisional application No. 62/438,222, filed on Dec. 22, 2016.

(56) References Cited

U.S. PATENT DOCUMENTS

| | | | |
|---|---|---|---|
| 10,084,582 | B2 | 9/2018 | Ly et al. |
| 10,306,568 | B2 | 5/2019 | Kim et al. |
| 10,469,229 | B2 | 11/2019 | Ly et al. |
| 10,615,947 | B2 | 4/2020 | Kishiyama |
| 11,368,271 | B2 | 6/2022 | Ly et al. |
| 2011/0255486 | A1 | 10/2011 | Luo et al. |
| 2016/0128095 | A1 | 5/2016 | Damnjanovic et al. |
| 2016/0270070 | A1 | 9/2016 | Mukkavilli et al. |
| 2016/0309518 | A1 | 10/2016 | Patel et al. |
| 2016/0316491 | A1 | 10/2016 | Axmon et al. |
| 2017/0006637 | A1* | 1/2017 | Sahlin .............. H04W 74/0833 |
| 2017/0142726 | A1* | 5/2017 | Kim .................... H04B 7/0632 |
| 2017/0303303 | A1 | 10/2017 | Yang et al. |
| 2017/0311355 | A1 | 10/2017 | Yi et al. |
| 2018/0183557 | A1 | 6/2018 | Ly et al. |
| 2018/0331806 | A1 | 11/2018 | Ly et al. |
| 2019/0254076 | A1* | 8/2019 | Siomina ............... H04W 24/10 |

FOREIGN PATENT DOCUMENTS

| | | |
|---|---|---|
| WO | WO-2016057193 | 4/2016 |
| WO | WO-2017027059 A1 | 2/2017 |
| WO | WO-2017083514 A1 | 5/2017 |
| WO | WO-2017150951 A1 | 9/2017 |
| WO | WO-2017196387 A1 | 11/2017 |

OTHER PUBLICATIONS

International Preliminary Report on Patentability—PCT/US2017/068166, The International Bureau of WIPO—Geneva, Switzerland, dated Jul. 4, 2019.
International Search Report and Written Opinion—PCT/US2017/068166—ISA/EPO—dated Apr. 3, 2018.
Motorola Mobility: "Discussion on RACH Numerology and Procedure", R1-1612746, 3GPP TSG RAN WG1 Meeting #87, Reno, Nevada, USA, Nov. 14-18, 2016, 3 Pages.
NTT Docomo Inc: "Discussion on PRACH for eLAA UL", 3GPP TSG RAN WG1 Meeting #84bis, R1-162803, Busan, Korea, Apr. 11, 2016-Apr. 15, 2016, pp. 1-5.
Qualcomm Incorporated: "Candidate Frame Structures", 3GPP TSG-RAN WG1 #85, 3GPP Draft; R1-164695, 3rd Generation Partnership Project (3GPP), Mobile Competence Centre; 650, Route Des Lucioles; F-06921 Sophia-Antipolis Cedex; France, vol. RAN WG1, No. Nanjing, China; May 14, 2016, pp. 1-8, May 23, 2016-May 27, 2016, XP051089940, Retrieved from the Internet: URL: https://www.3gpp.org/ftp/tsg_ran/WG1_RL1/TSGR1_85/Docs/R1-164695.zip [retrieved on May 14, 2016].
Qualcomm Incorporated: "Single Beam RACH Design", 3GPP Draft, 3GPP TSG-RAN WG1 #87, R1-1612030, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, 3 Pages, XP051175991, Retrieved from the Internet: URL: http://www.3gpp.org/ftp/Meetings_3GPP_SYNC/RAN1/Docs/ [retrieved on Nov. 13, 2016], Fig. 1 and Chapter 2.1.
Qualcomm Incorporated: "Single Beam RACH Design", 3GPP Draft; R1-1610163, 3rd Generation Partnership Project (3GPP), Mobile Competence Centre; 650, Route Des Lucioles; F-06921 Sophia-Anti Polls Cedex; France, vol. RAN WG1, No. Lisbon, Portugal; Oct. 1, 2016, XP051159964, Retrieved from the Internet: URL:http://www.3gpp.org/ftp/tsg_ran/WG1_RL1/TSGR1_86b/Docs/ (retrieved on Oct. 1, 2016], 3 pages.
Samsung: "RACH Preamble Format Considering Beam Correspondence", 3GPP Draft, 3GPP TSG RAN WG1 #87, R1-1612461, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, XP051176409, 4 Pages, Retrieved from the Internet: URL: http://www.3gpp.org/ftp_Meetings_3GPP_SYNC/RAN1/Docs/ [retrieved on Nov. 13, 2016], Fig. 2 and Chapter 2.
Taiwan Search Report—TW106145229—TIPO—dated Aug. 20, 2021.
Huawei., et al., "Considerations on NR RACH Preamble and Channel Design", 3GPP TSG RAN WG1 Meeting #87, R1-1611694, Reno, USA, Nov. 14-18, 2016, 3 Pages.
NTT Docomo Inc: "Views on Random Access Channel For NR", 3GPP TSG RAN WG1 Meeting #87, R1-1612708, Reno, USA Nov. 14-18, 2016, pp. 1-10.

\* cited by examiner

TECHNIQUES FOR SIGNALING DYNAMIC CONTROL REGION FOR PRACH TRANSMISSION

CROSS-REFERENCE TO RELATED APPLICATION(S)

This application is a Continuation of U.S. patent application Ser. No. 16/598,807, titled "TECHNIQUES FOR SIGNALING DYNAMIC CONTROL REGION FOR PRACH TRANSMISSION" and filed Oct. 10, 2019, which is a Continuation of U.S. patent application Ser. No. 16/030,453, entitled "TECHNIQUES FOR SIGNALING DYNAMIC CONTROL REGION FOR PRACH TRANSMISSION" and filed Jul. 9, 2018, which is a Continuation of U.S. patent application Ser. No. 15/850,428, titled "TECHNIQUES FOR SIGNALING DYNAMIC CONTROL REGION FOR PRACH TRANSMISSION" and filed Dec. 21, 2017, now U.S. Pat. No. 10,084,582 issued on Sep. 25, 2018, which claims the benefit of U.S. Provisional Application Ser. No. 62/438,222, titled "TECHNIQUES FOR SIGNALING DYNAMIC CONTROL REGION FOR PRACH TRANSMISSION" and filed on Dec. 22, 2016, which are expressly incorporated by reference herein in their entirety.

BACKGROUND

Aspects of the present disclosure relate generally to wireless communication networks, and more particularly, to techniques for signaling dynamic control region for physical random access channel (PRACH) transmission in 5th Generation (5G) communications technology, also referred to as New Radio (NR).

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which may be referred to as new radio (NR)) is envisaged to expand and support diverse usage scenarios and applications with respect to current mobile network generations. In an aspect, 5G communications technology may include: enhanced mobile broadband addressing human-centric use cases for access to multimedia content, services and data; ultra-reliable-low latency communications (URLLC) with certain specifications for latency and reliability; and massive machine type communications, which may allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current PRACH solutions may not provide customization for PRACH transmissions. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method of wireless communications including receiving, at a user equipment (UE), an indication of a number of symbols that the UE is to assume (e.g., use) when transmitting via a physical random access channel (PRACH), and transmitting, by the UE, via the PRACH over one or more slots based on the number of symbols.

In another aspect, the present disclosure includes a method of wireless communications, includes generating, at a network device, an indication of a number of symbols that a user equipment (UE) is to use when transmitting via a physical random access channel (PRACH), and transmitting, by the network device, the indication to the UE.

In another aspect, the present disclosure includes a user equipment (UE) for wireless communications, includes a memory, and one or more processors coupled with the memory, where the one or more processors are configured to receive an indication of a number of symbols that the UE is to use when transmitting via a physical random access channel (PRACH), and transmit via the PRACH over one or more slots based on the number of symbols.

In another aspect, the present disclosure includes a network device for wireless communications, including a memory, and one or more processors coupled with the memory, where the one or more processors are configured to generate an indication of a number of symbols that a user equipment (UE) is to use when transmitting via a physical random access channel (PRACH), and transmit the indication to the UE.

In another aspect, the present disclosure includes an apparatus for wireless communications, including means for receiving an indication of a number of symbols that the apparatus is to use when transmitting via a physical random access channel (PRACH), and means for transmitting via the PRACH over one or more slots based on the number of symbols.

In another aspect, the present disclosure includes an apparatus for wireless communications, including means for generating an indication of a number of symbols that a user equipment (UE) is to use when transmitting via a physical random access channel (PRACH), and means for transmitting the indication to the UE.

In another aspect, the present disclosure includes a computer-readable medium storing computer code executable by one or more processors in a user equipment (UE) for wireless communications, including code for receiving an indication of a number of symbols that the UE is to use when transmitting via a physical random access channel (PRACH), and code for transmitting via the PRACH over one or more slots based on the number of symbols.

In another aspect, the present disclosure includes a computer-readable medium storing computer code executable by one or more processors in a network device for wireless communications, including code for generating an indication of a number of symbols that a user equipment (UE) is to use when transmitting via a physical random access channel (PRACH), and code for transmitting the indication to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
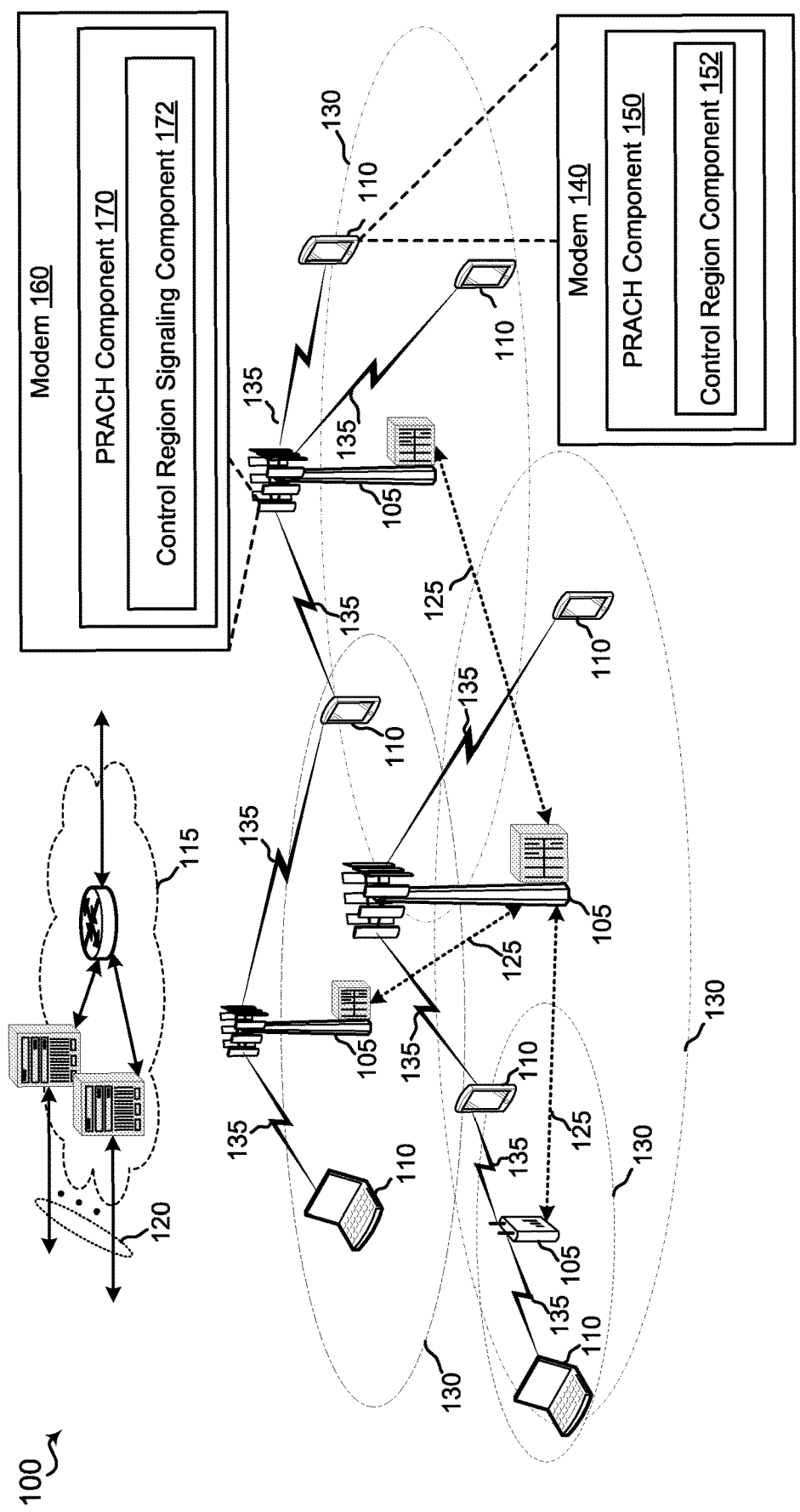
FIG. 1 is a schematic diagram of a wireless communication network including at least one user equipment (UE) and at least one base station having a PRACH component configured according to this disclosure for signaling of dynamic control region for PRACH transmission.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to a techniques for signaling dynamic control region for physical random access channel (PRACH) transmission in 5th Generation (5G) communications technology, also referred to as New Radio (NR). The control region may refer to the control symbols that a user equipment (UE) is to assume when transmitting PRACH. The control region may be dynamic in that the number of control symbols that can be assumed for transmitting PRACH can vary. The signaling may involve generating an indication that is transmitted (e.g., as part of a signal or system information block (SIB)) to a UE such that the UE need not assume a maximum number of control symbols, which may be too conservative an approach. Instead, the indication provides how many symbols the UE is to assume when transmitting PRACH. In some aspects, the control symbols may belong or be part of uplink (UL) common bursts (ULCB). In some aspects, the control symbols may belong or be part of downlink (DL) common bursts (DLCB).

Additional features of the present aspects are described in more detail below with respect to FIGS. 1-8.

It should be noted that the techniques described herein may be used for various wireless communication networks such as code-division multiple access (CDMA), time-division multiple access (TDMA), frequency-division multiple access (FDMA), orthogonal frequency-division multiple access (OFDMA), single-carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to 5G networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

In an aspect of the present disclosure, various 5G NR PRACH considerations may be taken into account for the techniques described in connection with the signaling of dynamic control region for PRACH transmission. For example, for different use cases the RACH functionality may be considered for various design or implementation aspects. For applications below 6 GHz, random access and UL synchronization may be used.

With respect to cell coverage, RACH preamble formats may be considered for various design or implementation aspects. For applications below 6 GHz, a range of 0-100 km may be used, with different numbers of formats being supported. For applications above 6 GHz, a range of 0-1 km may be used. In contrast, for LTE design, a range of 0-100 km may be used.

With respect to mobility, numerology selection and mobility handling in designing RACH preamble may be considered for various design or implementation aspects. For applications below 6 GHz, a range of 0-500 km/h (e.g., Doppler up to 1.9 kHz at 4 GHz) may be supported. For applications above 6 GHz, a range of 0-100 km/h may be supported. In contrast, for LTE design, a range of 0-350 km/h may be used.

Bandwidth may be considered together with tone spacing to define RACH preamble length for various designs or implementations. For applications below 6 GHz, the bandwidth may be less than 5 MHz. For applications above 6 GHz, the bandwidth may be X MHz, where X may be down selected from 5 MHz, 10 MHz, and 20 MHz. In contrast, for LTE design, a bandwidth of 1.08 MHz is used.

Regarding tone spacing, time footprint requirement and link budget may be considered for various design or implementation aspects. For both, applications below and above 6 GHz, a first option (Option 1) may be to use tone spacing characterized by 1.25×n (a superset of 15×n option), and a second option (Option 2) may also be used characterized by 15×n, where n is an integer. In contrast, for LTE design, 7.5 kHz and 1.25 kHz are used.

With respect to the time footprint, implementation simplicity and maximum L1 legacy may be considered for various design or implementation aspects. For applications below 6 GHz, PRACH need not overlap with DLCB or ULCB in a time division duplexing (TDD) slot structure. PRACH may need to overlap ULCB in frequency division duplexing (FDD) slot structure for large cell coverage. For applications above 6 GHz, PRACH need not overlap with DLCB in TDD slot structure. In contrast, for LTE design, TDD with special subframe (SF) is used with two 15 kHz symbols in UL pilot time slot (UpPTS). Also in LTE design, other TDD/FDD formats may be used spread over up to 3 consecutive UL subframes (SFs).

In an aspect of the present disclosure, the control region in PRACH, that is, the number of control symbols used in PRACH, is generally dynamic. For example, the number of control symbols may vary over time for slots used to transmit PRACH. Accordingly, a network entity (e.g., a base station) may signal or indicate to a UE how may control symbols the UE may assume when transmitting PRACH. Otherwise, PRACH transmission may be based on a worst case scenario (e.g., that a maximum number of control symbols are to be used), which may be too conservative.

In another aspect of the present disclosure, a UE may handle the signaling or indications provided by the network (e.g., network entity, base station) with respect to the control region (e.g., control symbols) for PRACH transmission. For example, a UE may handle ULCB and/or DLCB in a TDD uplink-centric slot (see e.g., FIG. 2). A flexible option may be to have or use a SIB for signaling. The SIB may indicate how many symbols to skip. For example, the SIB may include a "0" to indicate not to skip common burst or a "1" to indicate include a split symbol. That is, the SIB may indicate whether the control symbols overlap a ULCB or not. There may be multiple PRACH formats to fit the available time resource. Accordingly, in some aspects, the SIB may also indicate the PRACH format.

In another aspect, there may be an agreement between the network and a UE about multiple PRACH formats supported and the network may then signal or indicate the PRACH format to be used by the UE. The PRACH format may indicate to skip common burst (e.g., do not overlap the common burst) or ignore common burst (e.g., overlap with the common burst).

In another aspect of the present disclosure, the network may signal a PRACH collision with common burst. Based on this information, the UE may drop the common burst part of the PRACH. For example, when the collision is associated with the same UE, the UE receiving the PRACH collision signal may drop the common burst part of the PRACH (e.g., may not overlap with the common burst) for PRACH transmission. When the collision is associated with a different UE, the UE receiving the PRACH signal may transmit PRACH in the common burst.

Referring to FIG. 1, in accordance with various aspects of the present disclosure, an example wireless communication network 100 includes at least one UE 110 with a modem 140 having a PRACH component 150 with a control region component 152 that is configured to perform various aspects described herein for PRACH transmission in accordance with dynamic control region (e.g., control symbols) signaling. Further, wireless communication network 100 includes at least one base station 105 with a modem 160 having a PRACH component 170 with a control region signaling component 172 that is configured to perform various aspects described herein for signaling dynamic control region to a UE for PRACH transmission. Thus, according to the present disclosure, various techniques for signaling and/or handling signaling of dynamic control region for PRACH transmission in 5G NR communications technology are described.

The wireless communication network 100 may include one or more base stations 105, one or more UEs 110, and a core network 115. The core network 115 may provide user authentication, access authorization, tracking, internet protocol (IP) connectivity, and other access, routing, or mobility functions. The base stations 105 may interface with the core network 115 through backhaul links 120 (e.g., S1, etc.). The base stations 105 may perform radio configuration and scheduling for communication with the UEs 110, or may operate under the control of a base station controller (not shown). In various examples, the base stations 105 may communicate, either directly or indirectly (e.g., through core network 115), with one another over backhaul links 125 (e.g., X1, etc.), which may be wired or wireless communication links.

The base stations 105 may wirelessly communicate with the UEs 110 via one or more base station antennas. Each of the base stations 105 may provide communication coverage for a respective geographic coverage area 130. In some examples, base stations 105 may be referred to as a base transceiver station, a radio base station, an access point, an access node, a radio transceiver, a NodeB, eNodeB (eNB), gNB, Home NodeB, a Home eNodeB, a relay, or some other suitable terminology. The geographic coverage area 130 for a base station 105 may be divided into sectors or cells making up only a portion of the coverage area (not shown). The wireless communication network 100 may include base stations 105 of different types (e.g., macro base stations or small cell base stations, described below). Additionally, the plurality of base stations 105 may operate according to different ones of a plurality of communication technologies (e.g., 5G (New Radio or "NR"), fourth generation (4G)/LTE, 3G, Wi-Fi, Bluetooth, etc.), and thus there may be overlapping geographic coverage areas 130 for different communication technologies.

In some examples, the wireless communication network 100 may be or include one or any combination of communication technologies, including a NR or 5G technology, a Long Term Evolution (LTE) or LTE-Advanced (LTE-A) or MuLTEfire technology, a Wi-Fi technology, a Bluetooth technology, or any other long or short range wireless communication technology. In LTE/LTE-A/MuLTEfire networks, the term evolved node B (eNB) may be generally used to describe the base stations 105, while the term UE may be generally used to describe the UEs 110. The wireless communication network 100 may be a heterogeneous technology network in which different types of eNBs provide coverage for various geographical regions. For example, each eNB or base station 105 may provide communication coverage for a macro cell, a small cell, or other types of cell. The term "cell" is a 3GPP term that may be used to describe a base station, a carrier or component carrier associated with a base station, or a coverage area (e.g., sector, etc.) of a carrier or base station, depending on context.

A macro cell may generally cover a relatively large geographic area (e.g., several kilometers in radius) and may allow unrestricted access by UEs 110 with service subscriptions with the network provider.

A small cell may include a relative lower transmit-powered base station, as compared with a macro cell, that may operate in the same or different frequency bands (e.g., licensed, unlicensed, etc.) as macro cells. Small cells may include pico cells, femto cells, and micro cells according to various examples. A pico cell, for example, may cover a small geographic area and may allow unrestricted access by UEs 110 with service subscriptions with the network provider. A femto cell may also cover a small geographic area (e.g., a home) and may provide restricted access and/or unrestricted access by UEs 110 having an association with the femto cell (e.g., in the restricted access case, UEs 110 in a closed subscriber group (CSG) of the base station 105, which may include UEs 110 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), medium access control (MAC), etc.), may perform packet segmentation and reassembly to communicate over logical channels. For example, a MAC layer may perform priority handling and multiplexing of logical channels into transport channels. The MAC layer may also use hybrid automatic repeat/request (HARQ) to provide retransmission at the MAC layer to improve link efficiency. In the control plane, a radio resource control (RRC) protocol layer may provide establishment, configuration, and maintenance of an RRC connection between a UE 110 and the base stations 105. The RRC protocol layer may also be used for core network 115 support of radio bearers for the user plane data. At the physical (PHY) layer, the transport channels may be mapped to physical channels.

The UEs 110 may be dispersed throughout the wireless communication network 100, and each UE 110 may be stationary or mobile. A UE 110 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 110 may be a cellular phone, a smart phone, a personal digital assistant (PDA), a wireless modem, a wireless communication device, a handheld device, a tablet computer, a laptop computer, a cordless phone, a smart watch, a wireless local loop (WLL) station, an entertainment device, a vehicular component, a customer premises equipment (CPE), or any device capable of communicating in wireless communication network 100. Additionally, a UE 110 may be Internet of Things (IoT) and/or machine-to-machine (M2M) type of device, e.g., a low power, low data rate (relative to a wireless phone, for example) type of device, that may in some aspects communicate infrequently with wireless communication network 100 or other UEs. A UE 110 may be able to communicate with various types of base stations 105 and network equipment including macro eNBs, small cell eNBs, macro gNBs, small cell gNBs, relay base stations, and the like.

UE 110 may be configured to establish one or more wireless communication links 135 with one or more base stations 105. The wireless communication links 135 shown in wireless communication network 100 may carry UL transmissions from a UE 110 to a base station 105, or DL transmissions from a base station 105 to a UE 110. The DL transmissions may also be called forward link transmissions while the UL transmissions may also be called reverse link transmissions. Each wireless communication link 135 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. In an aspect, the wireless communication links 135 may transmit bidirectional communications using FDD operation (e.g., using paired spectrum resources) or TDD)operation (e.g., using unpaired spectrum resources). Frame structures may be defined for FDD (e.g., frame structure type 1) and TDD (e.g., frame structure type 2). Moreover, in some aspects, the wireless communication links 135 may represent one or more broadcast channels.

In some aspects of the wireless communication network 100, base stations 105 or UEs 110 may include multiple antennas for employing antenna diversity schemes to improve communication quality and reliability between base stations 105 and UEs 110. Additionally or alternatively, base stations 105 or UEs 110 may employ multiple input multiple output (MIMO) techniques that may take advantage of multi-path environments to transmit multiple spatial layers carrying the same or different coded data.

Wireless communication network 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 110 may be configured with multiple DL CCs and one or more UL CCs for CA. CA may be used with both FDD and TDD CCs. The base stations 105 and UEs 110 may use spectrum up to Y MHz (e.g., Y=5, 10, 15, or 20 MHz) bandwidth per carrier allocated in a CA of up to a total of Yx MHz (x=number of CCs) used for transmission in each direction. The carriers may or may not be adjacent to each other. Allocation of carriers may be asymmetric with respect to DL and UL (e.g., more or less carriers may be allocated for DL than for UL). The CCs may include a primary CC and one or more secondary CCs. A primary CC may be referred to as a primary cell (PCell) and a secondary CC may be referred to as a secondary cell (SCell).

The wireless communications network 100 may further include base stations 105 operating according to wireless local area network (WLAN) or Wi-Fi technology, e.g., Wi-Fi access points, in communication with UEs 110 operating according to Wi-Fi technology, e.g., Wi-Fi stations (STAs) via communication links in an unlicensed frequency spectrum (e.g., 5 GHz). When communicating in an unlicensed frequency spectrum, the STAs and AP may perform a clear channel assessment (CCA) or listen before talk (LBT) procedure prior to communicating in order to determine whether the channel is available.

Additionally, one or more of base stations 105 and/or UEs 110 may operate according to a NR or 5G technology referred to as millimeter wave (mmW or mmwave) technology. For example, mmW technology includes transmissions in mmW frequencies and/or near mmW frequencies. Extremely high frequency (EHF) is part of the radio frequency (RF) in the electromagnetic spectrum. EHF has a range of 30 GHz to 300 GHz and a wavelength between 1 millimeter and 10 millimeters. Radio waves in this band may be referred to as a mmW. Near mmW may extend down to a frequency of 3 GHz with a wavelength of 100 millimeters. For example, the super high frequency (SHF) band extends between 3 GHz and 30 GHz, and may also be referred to as centimeter wave. Communications using the mmW and/or near mmW radio frequency band has extremely high path loss and a short range. As such, base stations 105 and/or UEs 110 operating according to the mmW technology may utilize beamforming in their transmissions to compensate for the extremely high path loss and short range.

Figure 2:
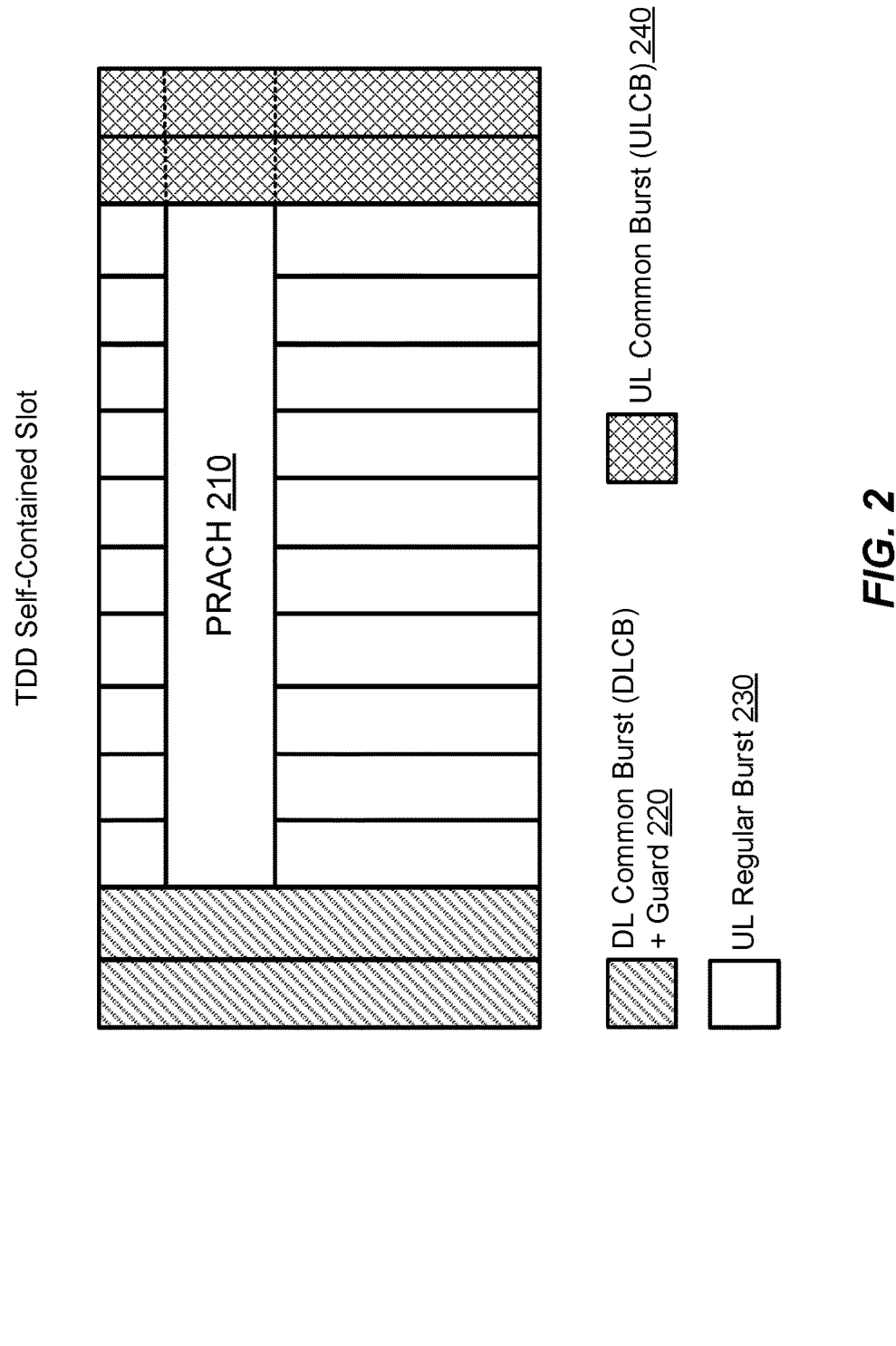
FIG. 2 is an example of PRACH in a time division duplexing (TDD) self-contained uplink-centric slot.

Referring to FIG. 2, there is shown a structure 200 illustrating an example of PRACH 210 in a TDD self-contained uplink-centric slot. A self-contained slot may refer to a slot structure in which an UL grant is received and a UL transmission takes place in response, all within the same slot structure. The structure 200 includes a DLCB with a guard (G) 220, a UL regular burst 230 that overlaps with the PRACH 210, and a ULCB 240 at the end. In the example shown, the DLCB 220 may include 2 symbols, the UL regular burst 230 may include 10 symbols, and the ULCB 240 may include 2 symbols. In some cases, the PRACH 210 may extend or overlap the UCLB 240 as shown by the dashed lines. Accordingly, in some examples of a TDD self-contained uplink-centric slot, the PRACH 210 may overlap 10 symbols (e.g., the PRACH 210 overlaps with only the UL regular burst 230), and in some examples the PRACH 210 may overlap 12 symbols (e.g., the PRACH 210 overlaps with the UL regular burst 230 and the ULCB 240).

Figure 3:
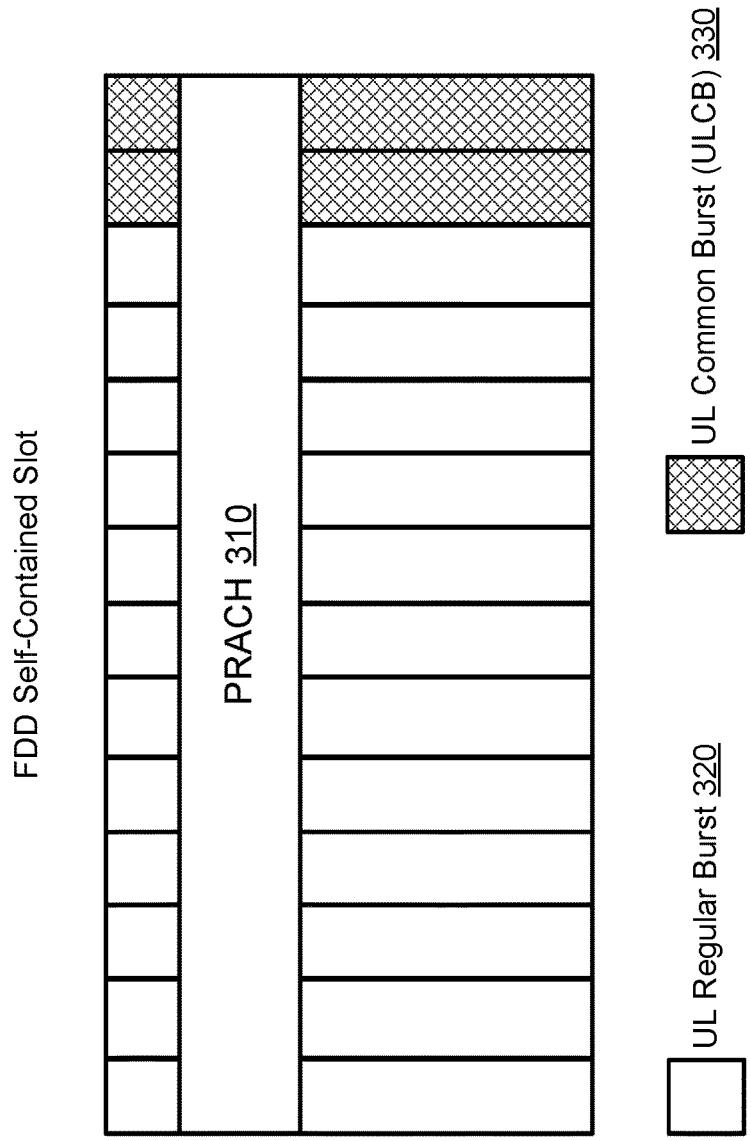
FIG. 3 is an example of PRACH in a frequency division duplexing (FDD) uplink-centric slot.

Referring to FIG. 3, there is shown a structure 300 illustrating an example of PRACH 310 in an FDD uplink-centric slot. The structure 300 includes an UL regular burst 320 and an ULCB 330 at the end. The PRACH 310 may overlap the UL regular burst 320 and the ULCB. However, in some examples, the PRACH 310 may not overlap the ULCB. In the example shown, the UL regular burst 320 may include 12 symbols, and the ULCB 330 may include 2 symbols. Accordingly, in some examples a FDD self-contained uplink-centric slot, the PRACH 310 may overlap 12 symbols (e.g., the PRACH 310 overlaps with only the UL regular burst 320), and in some examples the PRACH 310 may overlap 14 symbols (e.g., the PRACH 310 overlaps with the UL regular burst 320 and the ULCB 330).

As described above, in some aspects, the network may indicate (e.g., via an SIB) how many control symbols in a particular slot structure the UE is to assume when transmitting PRACH (e.g., PRACH 210 or PRACH 310) to avoid having to use the maximum number of possible control symbols, which may be too conservative. For example, the base station 105 may transmit a SIB to indicate the UE 110 is to assume 10 or 12 symbols for a TDD self-contained uplink-centric slot, or 12 or 14 symbols for a FDD self-contained uplink-centric slot.

As described above, in some aspects, the UE may handle the signaling or indications provided by the network with respect to a control region. For example, a base station 105 may indicate how many symbols the UE 110 should skip. For example, the base station 105 may transmit an SIB that includes a "0" to indicate PRACH not to skip common burst (e.g., do not overlap with the ULCB 240) or a "1" to indicate PRACH to skip common burst (e.g., overlap with the ULCB 240) and the UE may skip/not skip common bursts based on the indication.

As described above, in some aspects, a UE may receive an indication of a PRACH collision with the common burst portion and, based on the indication determine PRACH to overlap or not to overlap with common burst portions. For example, the base station 105 may indicate (e.g., via an SIB) a PRACH collision with the common burst. Based on the indication, the UE 110 may configure PRACH to overlap the common burst portion (e.g., ULCB 210 or 310) when the PRACH collision is associated with the UE 110, and the UE 110 may configure PRACH to not overlap the common burst portion (e.g., ULCB 210 or 310) when the PRACH collision is not associated with the UE 110.

Figure 4:
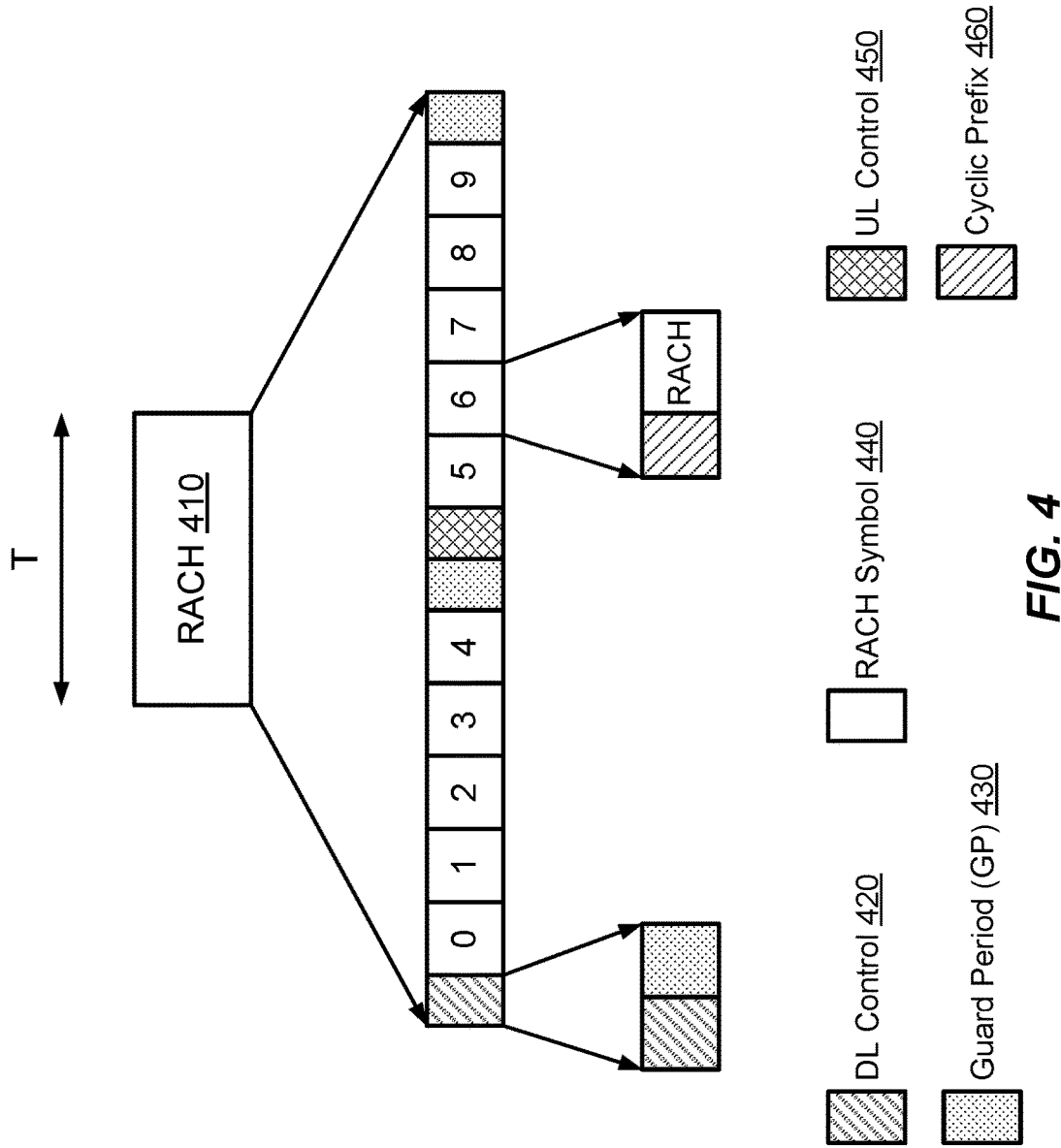
FIG. 4 is an example of a RACH using slot aggregation for beam sweeping of PRACH.

Referring to FIG. 4, there is shown a structure 400 illustrating an example of a RACH format 410 in the PRACH (e.g., PRACH 210 or PRACH 310), where beam sweeping of the PRACH is performed in mmW technology. The RACH format 410 may include a RACH preamble and/or a RACH message. As shown in FIG. 4, the RACH 410 may have a duration time of T (e.g., 500 μs) and may be formed from the aggregation of two different slot structures (e.g., two slots of 250 μs each). When slot structures are aggregated as in this example, some of the regions or portions of one or more of the slot structures may be omitted. In this example, the RACH format 410 includes a DL control 420 with a guard period (GP) 430, followed by five (5) RACH symbols 440, a GP 430, a UL control 450, five (5) additional RACH symbols 440, and a GP 430 at the end. The RACH symbols 440 may include a cyclic prefix (CP) 460 and a RACH preamble or a RACH message.

In some aspects, the PRACH format may indicate whether the control symbols overlap a common burst or not. For example, the base station 105 may transmit an SIB that indicates a PRACH format to be used by UE 110. Based on the indicated PRACH format, the UE 110 may determine a number of PRACH formats to fit in an available time resource, and may skip or not skip common burst (e.g., do not overlap with the ULCB 240) based on the a number of PRACH formats that fit within a TDD/FDD self-contained slot. For example, based on the number of RACH 410 that fit within PRACH 210 or 310.

In some examples, there may be an agreement between the network and a UE about multiple PRACH formats supported and the network may then signal or indicate the PRACH format to be used by the UE. The PRACH format may indicate to skip common burst (e.g., do not overlap the common burst) or ignore common burst (e.g., overlap with the common burst). For example, the UE 110 and base station 105 may have an agreement for multiple PRACH formats supported between the UE 110 and the base station 105. The UE 110 and the base station 105 may be preprogrammed with the agreement or the agreement may be communicated between each other. The agreement may indicate PRACH should overlap common burst portions when the base station 105 indicates a first PRACH format type to be used by the UE 105, and PRACH should not overlap common burst portions when the base station 105 indicates a second PRACH format type to be used by the UE 105.

Figure 5:
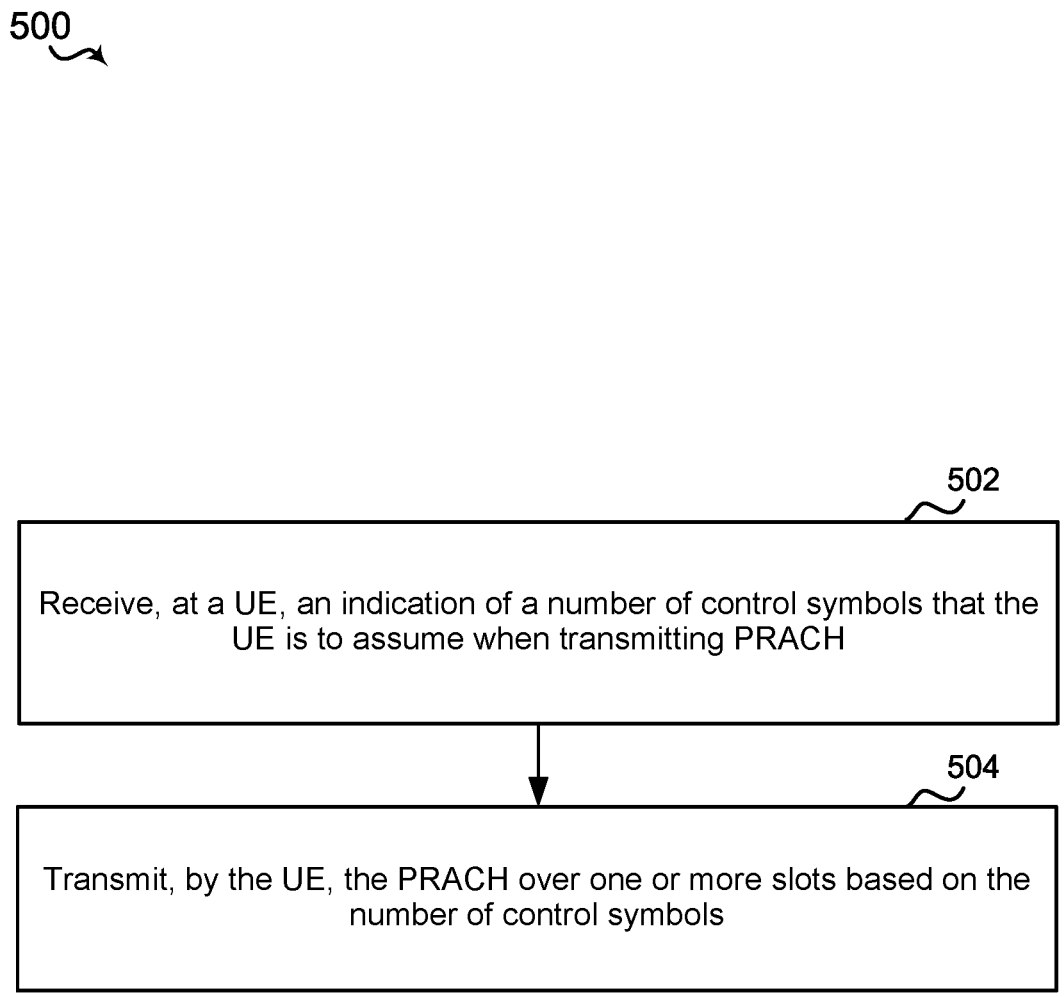
FIG. 5 is a flow diagram of an example of a method of handling signaling of dynamic control region for PRACH transmission.

Referring to FIG. 5, for example, a method 500 of wireless communication in operating UE 110 according to the above-described aspects to transmit PRACH in accordance with signaling of the dynamic control region includes one or more of the herein-defined actions.

For example, at 502, method 500 includes receiving, at a UE, an indication of a number of control symbols that the UE is to assume when transmitting PRACH. For instance, in an aspect, UE 110 may execute PRACH component 150 and/or control region component 152 (and/or transceiver 702, RF components as described in FIG. 7 below) to receive the indication, as described herein.

At 504, the method 500 includes transmitting, by the UE, via the PRACH over one or more slots based on the number of control symbols. For instance, in an aspect, UE 110 may execute PRACH component 150 and/or control region component 152 (and/or transceiver 702, RF components as described in FIG. 7 below) to transmit PRACH based on the information provided and/or inferred from the indication, as described herein.

In another aspect of method 500, receiving the indication may include receiving an SIB that indicates the number of control symbols. For example, the UE 110 may execute PRACH component 150 and/or control region component 152 (and/or transceiver 702, RF components as described in FIG. 7 below) to receive an SIB indicating that the number of control symbols includes 10-14 symbols, as described in FIGS. 2 and 3.

In another aspect of method 500, the one or more slots may include a TDD self-contained uplink-centric slot (see e.g., FIG. 2). The TDD self-contained uplink-centric slot may include a DLCB portion (e.g., DLCB 220), a regular burst portion (e.g., UL regular burst 230), and a ULCB portion (e.g., ULCB 240).

In another aspect of method 500, the one or more slots may include a FDD uplink-centric slot (see e.g., FIG. 3). The FDD uplink-centric slot may include a regular burst portion (e.g., UL regular burst 320) and a ULCB portion (e.g., ULCB 330).

In another aspect of method 500, the number of control symbols is such that PRACH extends into a ULCB portion (e.g., ULCB 240 or ULCB 330) of at least one of the one or more slots.

In another aspect of method 500, the indication identifies which control symbols are not used for PRACH transmission. For example, the network may indicate whether UE 110 is to assume that certain control symbols exist or not, such as symbols that overlap with ULCB 240 of FIG. 2 or ULCB 330 of FIG. 3.

In another aspect of method 500, associated with the PRACH transmission may be a beam sweeping of PRACH in mmW.

In another aspect of method 500, receiving the indication may include receiving a signal indicating a PRACH format, and the number of control symbols may be identified from the PRACH format. For example, PRACH component 150 and/or control region component 152 (and/or transceiver 702, RF components as described in FIG. 7 below) of UE 110 and PRACH component 170 and/or control region signaling component 172 of the base station 105 may have an agreement on multiple PRACH formats supported between the UE 110 and the base station 105. The UE 110 and the base station 105 may be preprogrammed with the agreement or the agreement may be communicated between each other. The agreement may indicate PRACH should overlap common burst portions when the base station 105 indicates a first PRACH format type to be used by the UE 105, and PRACH should not overlap common burst portions when the base station 105 indicates a second PRACH format type to be used by the UE 105.

In another aspect of method 500, receiving the indication may include receiving a signal indicating whether PRACH overlaps with a ULCB of the one or more slots, and the number of control symbols may be identified based on whether PRACH overlaps with a ULCB of the one or more slots. For example, the UE 110 execute PRACH component 150 and/or control region component 152 (and/or transceiver 702, RF components as described in FIG. 7 below) to receive an SIB indicating that the number of control symbols includes 10-14 symbols, as described in FIGS. 2 and 3. In an example, the UE 110 may overlap PRACH 210 with ULCB 240 if the number of control symbols is 12 and may overlap PRACH 310 with ULCB 330 if the number of control symbols is 14. Otherwise, PRACH does not overlap a common burst portion.

In another aspect of method 500, receiving the indication may include receiving a signal indicating a PRACH collision with a ULCB of the one or more slots, and the number of control symbols may be identified from the PRACH collision. For example, the base station 105 may PRACH component 170 and/or control region signaling component 172 to indicate (e.g., via an SIB) a PRACH collision with the common burst. Based on the indication, the UE 110 may execute PRACH component 150 and/or control region component 152 (and/or transceiver 702, RF components as described in FIG. 7 below) to overlap PRACH with the common burst portion (e.g., ULCB 210 or 310) when the PRACH collision is associated with the UE 110, or to no overlap PRACH with the common burst portion (e.g., ULCB 210 or 310) when the PRACH collision is not associated with the UE 110.

Figure 6:
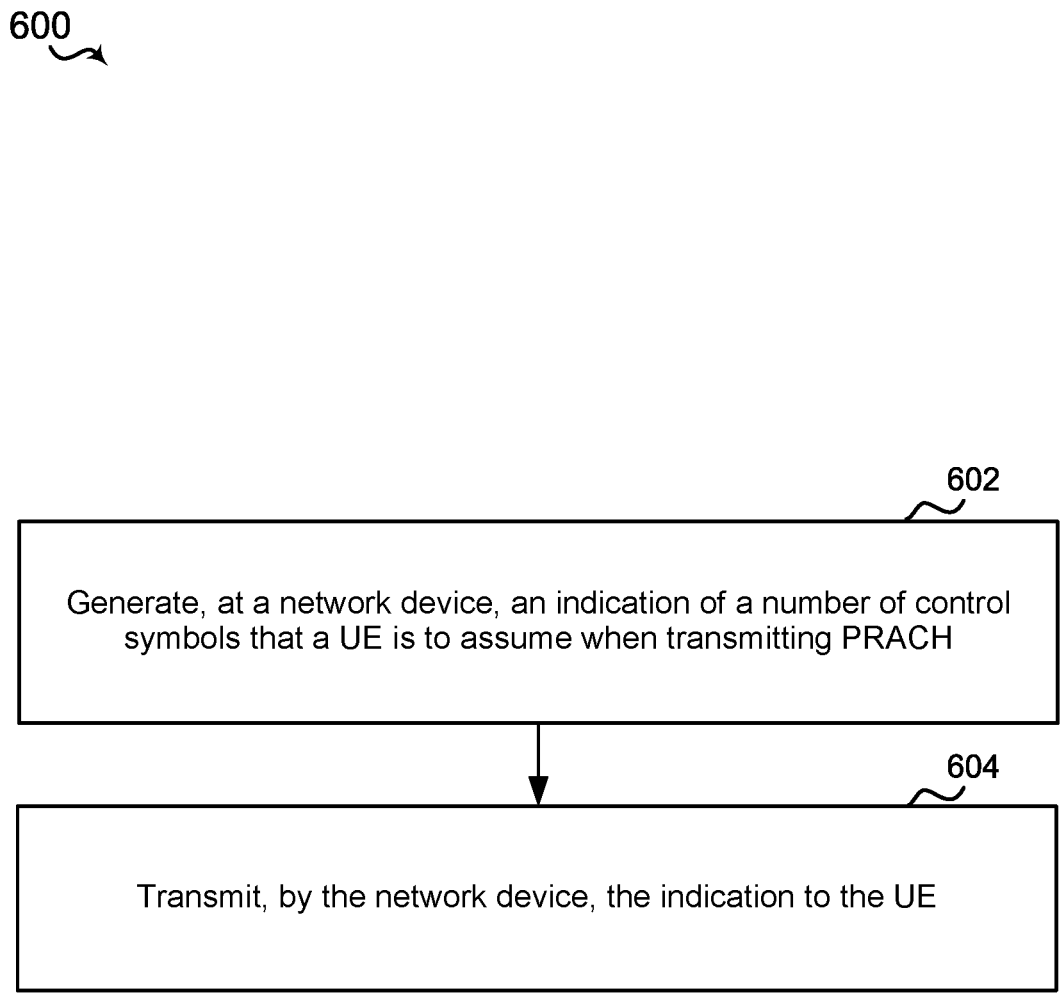
FIG. 6 is a flow diagram of an example of signaling of dynamic control region for PRACH transmission.

Referring to FIG. 6, for example, a method 600 of wireless communication in operating a network device (e.g., base station 105) according to the above-described aspects to signal the dynamic control region for PRACH transmission includes one or more of the herein-defined actions.

For example, at 602, method 600 includes generating, at a network device (e.g., base station 105) an indication of a number of control symbols that a UE is to assume when transmitting PRACH. For instance, in an aspect, base station 105 may execute PRACH component 170 and/or control region signaling component 172 to generate an indication or signal, as described herein.

At 604, the method 600 includes transmitting the indication or signal to a UE. For instance, in an aspect, base station 105 may execute PRACH component 170 and/or control region signaling component 172 (and/or transceiver 802, RF components as described in FIG. 8 below) to transmit the indication or signal, as described herein.

In another aspect of method 600, the indication may be transmitted to the UE over a SIB. For example, the base station 105 may execute may execute PRACH component 170 and/or control region signaling component 172 (and/or transceiver 802, RF components as described in FIG. 8 below) to transmit an SIB indicating that the number of control symbols includes 10-14 symbols, as described in FIGS. 2 and 3.

In another aspect of method 600, the indication may be transmitted to the UE over a signal, where the indication may identify a PRACH format from which to obtain the number of control symbols. For example, PRACH component 150 and/or control region component 152 (and/or transceiver 702, RF components as described in FIG. 7 below) of UE 110 and PRACH component 170 and/or control region signaling component 172 of the base station 105 may have an agreement on multiple PRACH formats supported between the UE 110 and the base station 105. The UE 110 and the base station 105 may be preprogrammed with the agreement or the agreement may be communicated between each other. The agreement may indicate PRACH should overlap common burst portions when the base station 105 indicates a first PRACH format type to be used by the UE 105, and PRACH should not overlap common burst portions when the base station 105 indicates a second PRACH format type to be used by the UE 105.

In another aspect of method 600, the indication may be transmitted to the UE over a signal, where the indication may identify whether PRACH overlaps with a ULCB of one or more slots, and where the number of control symbols may be obtained based on whether PRACH overlaps with a ULCB of the one or more slots.

In another aspect of method 600, the indication may be transmitted to the UE over a signal, where the indication may identify a PRACH collision with a ULCB of one or more slots, and where the number of control symbols may be obtained from the PRACH collision. For example, the base station 105 may execute PRACH component 170 and/or control region signaling component 172 to indicate (e.g., via an SIB) a PRACH collision with the common burst. Based on the indication, the UE 110 may execute PRACH component 150 and/or control region component 152 (and/or transceiver 702, RF components as described in FIG. 7 below) to overlap PRACH with the common burst portion (e.g., ULCB 210 or 310) when the PRACH collision is associated with the UE 110, or to no overlap PRACH with the common burst portion (e.g., ULCB 210 or 310) when the PRACH collision is not associated with the UE 110.

Figure 7:
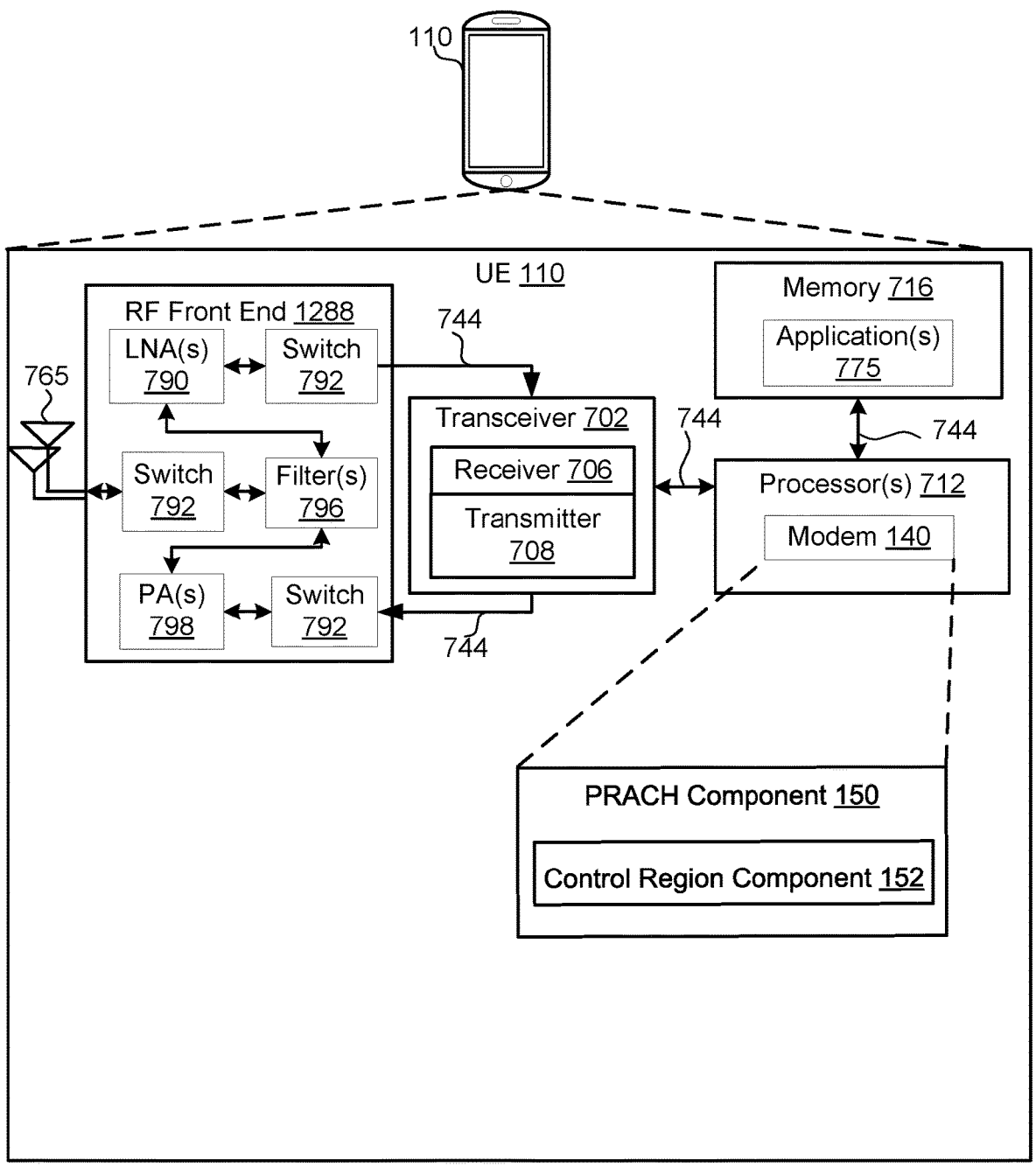
FIG. 7 is a schematic diagram of examples of components of the UE of FIG. 1.

Referring to FIG. 7, one example of an implementation of UE 110 may include a variety of components, some of which have already been described above, but including components such as one or more processors 712 and memory 716 and transceiver 702 in communication via one or more buses 744, which may operate in conjunction with modem 140 and PRACH component 150 and/or control region component 152 to enable one or more of the functions described herein related to transmitting PRACH in accordance with the signaling of dynamic control region (e.g., method 500). Further, the one or more processors 712, modem 140, memory 716, transceiver 702, RF front end 788 and one or more antennas 765, may be configured to support voice and/or data calls (simultaneously or non-simultaneously) in one or more radio access technologies.

In an aspect, the one or more processors 712 may include a modem 140 that uses one or more modem processors. The various functions related to PRACH component 150 and/or control region component 152 may be included in modem 140 and/or processors 712 and, in an aspect, may be executed by a single processor, while in other aspects, different ones of the functions may be executed by a combination of two or more different processors. For example, in an aspect, the one or more processors 712 may include any one or any combination of a modem processor, or a baseband processor, or a digital signal processor, or a transmit processor, or a receiver processor, or a transceiver processor associated with transceiver 702. In other aspects, some of the features of the one or more processors 712 and/or modem 140 associated with PRACH component 150 and/or control region component 152 may be performed by transceiver 702.

Also, memory 716 may be configured to store data used herein and/or local versions of applications 775 or PRACH component 150 and/or one or more of its subcomponents being executed by at least one processor 712. Memory 716 may include any type of computer-readable medium usable by a computer or at least one processor 712, such as random access memory (RAM), read only memory (ROM), tapes, magnetic discs, optical discs, volatile memory, non-volatile memory, and any combination thereof. In an aspect, for example, memory 716 may be a non-transitory computer-readable storage medium that stores one or more computer-executable codes defining PRACH component 150 and/or one or more of its subcomponents, and/or data associated therewith, when UE 110 is operating at least one processor 712 to execute PRACH component 150 and/or one or more of its subcomponents.

Transceiver 702 may include at least one receiver 706 and at least one transmitter 708. Receiver 706 may include hardware, firmware, and/or software code executable by a processor for receiving data, the code comprising instructions and being stored in a memory (e.g., computer-readable medium). Receiver 706 may be, for example, a radio frequency (RF) receiver. In an aspect, receiver 706 may receive signals transmitted by at least one base station 105. Additionally, receiver 706 may process such received signals, and also may obtain measurements of the signals, such as, but not limited to, Ec/Io, SNR, RSRP, RSSI, etc. Transmitter 708 may include hardware, firmware, and/or software code executable by a processor for transmitting data, the code comprising instructions and being stored in a memory (e.g., computer-readable medium). A suitable example of transmitter 708 may including, but is not limited to, an RF transmitter. Transceiver 702, receiver 706, and/or transmitter 708 may be configured to operate in mmW frequencies and/or near mmW frequencies.

Moreover, in an aspect, UE 110 may include RF front end 788, which may operate in communication with one or more antennas 765 and transceiver 702 for receiving and transmitting radio transmissions, for example, wireless communications transmitted by at least one base station 105 or wireless transmissions transmitted by UE 110. RF front end 788 may be connected to one or more antennas 765 and may include one or more low-noise amplifiers (LNAs) 790, one or more switches 792, one or more power amplifiers (PAs) 798, and one or more filters 796 for transmitting and receiving RF signals.

In an aspect, LNA 790 may amplify a received signal at a desired output level. In an aspect, each LNA 790 may have a specified minimum and maximum gain values. In an aspect, RF front end 788 may use one or more switches 792 to select a particular LNA 790 and its specified gain value based on a desired gain value for a particular application.

Further, for example, one or more PA(s) 798 may be used by RF front end 788 to amplify a signal for an RF output at a desired output power level. In an aspect, each PA 798 may have specified minimum and maximum gain values. In an aspect, RF front end 788 may use one or more switches 792 to select a particular PA 798 and its specified gain value based on a desired gain value for a particular application.

Also, for example, one or more filters 796 may be used by RF front end 788 to filter a received signal to obtain an input RF signal. Similarly, in an aspect, for example, a respective filter 796 may be used to filter an output from a respective PA 798 to produce an output signal for transmission. In an aspect, each filter 796 may be connected to a specific LNA 790 and/or PA 798. In an aspect, RF front end 788 may use one or more switches 792 to select a transmit or receive path using a specified filter 796, LNA 790, and/or PA 798, based on a configuration as specified by transceiver 702 and/or processor 712.

As such, transceiver 702 may be configured to transmit and receive wireless signals through one or more antennas 765 via RF front end 788. In an aspect, transceiver 702 may be tuned to operate at specified frequencies such that UE 110 may communicate with, for example, one or more base stations 105 or one or more cells associated with one or more base stations 105. In an aspect, for example, modem 140 may configure transceiver 702 to operate at a specified frequency and power level based on the UE configuration of the UE 110 and the communication protocol used by modem 140.

In an aspect, modem 140 may be a multiband-multimode modem, which may process digital data and communicate with transceiver 702 such that the digital data is sent and received using transceiver 702. In an aspect, modem 140 may be multiband and be configured to support multiple frequency bands for a specific communications protocol. In an aspect, modem 140 may be multimode and be configured to support multiple operating networks and communications protocols. In an aspect, modem 140 may control one or more components of UE 110 (e.g., RF front end 788, transceiver 702) to enable transmission and/or reception of signals from the network based on a specified modem configuration. In an aspect, the modem configuration may be based on the mode of the modem and the frequency band in use. In another aspect, the modem configuration may be based on UE configuration information associated with UE 110 as provided by the network during cell selection and/or cell reselection.

Figure 8:
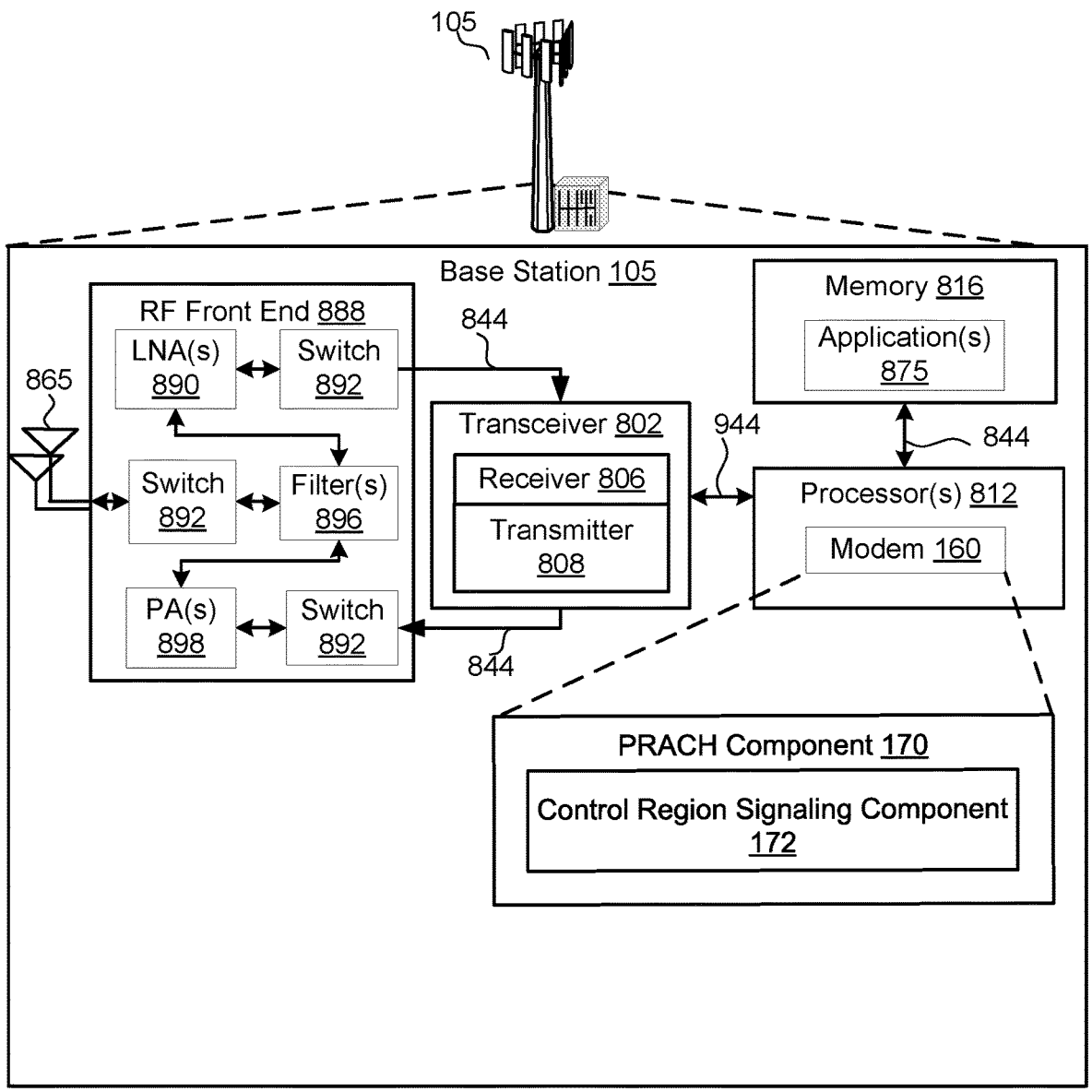
FIG. 8 is a schematic diagram of examples of components of the base station of FIG. 1.

Referring to FIG. 8, one example of an implementation of base station 105 may include a variety of components, some of which have already been described above, but including components such as one or more processors 812, memory 816 and transceiver 802 in communication via one or more buses 844, which may operate in conjunction with modem 160 and PRACH component 170 and/or control region signaling component 172 to enable one or more of the functions described herein related to signaling dynamic control region for PRACH transmission by a UE (e.g., method 600).

The transceiver 802, receiver 806, transmitter 808, one or more processors 812, memory 816, applications 875, buses 844, RF front end 888, LNAs 890, switches 892, filters 896, PAs 898, and one or more antennas 865 may be the same as or similar to the corresponding components of UE 110, as described above, but configured or otherwise programmed for base station operations as opposed to UE operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications by a user equipment (UE), comprising:
   identifying symbols to be used by the UE to transmit a physical random access channel (PRACH) within a subframe;
   identifying one or more symbols to be skipped by the PRACH within the subframe; and
   transmitting the PRACH over one or more slots of the subframe based, at least in part, on the symbols to be used and the one or more symbols to be skipped,
   wherein a format of the PRACH comprises one of a plurality of PRACH formats, a number of symbols used to transmit the PRACH is dynamically variable, and the one or more symbols to be skipped by the PRACH within the subframe is based on a number of PRACH formats of the plurality of PRACH formats that fit within the one or more slots of the subframe.

2. The method of claim 1, further comprising:
   identifying a starting symbol for the PRACH to be transmitted over the one or more slots of the subframe; and
   wherein the transmitting the PRACH the over one or more slots of the subframe is further based, at least in part, on a starting symbol for the PRACH.

3. The method of claim 1, wherein the transmitting the PRACH over one or more slots of the subframe is further based, at least in part, on an indication that the PRACH is to overlap one or more common burst portions of the one or more slots of the subframe.

4. The method of claim 3, wherein the one or more common burst portions includes an uplink common burst portion.

5. The method of claim 1, wherein identifying the symbols to be used by the UE to transmit the PRACH within the subframe is based, at least in part, on an indication of a PRACH collision received by the UE.

6. The method of claim 5, wherein the indication indicates an occurrence of the PRACH collision.

7. The method of claim 1, wherein identifying the one or more symbols to be skipped by the PRACH within the subframe is based, at least in part, on an indication of a PRACH collision received by the UE.

8. The method of claim 7, wherein the indication indicates an occurrence of the PRACH collision.

9. The method of claim 1, wherein identifying the symbols to be used by the UE to transmit the PRACH within the subframe is based, at least in part, on a first indication in a system information block (SIB), and wherein identifying the one or more symbols to be skipped by the PRACH within the subframe is based, at least in part, on a second indication in the SIB.

10. The method of claim 1, wherein a slot of the one or more slots of the subframe comprises a time division duplexing (TDD) self-contained uplink-centric slot.

11. The method of claim 1, wherein a slot of the one or more slots of the subframe comprises a frequency division duplexing (FDD) uplink-centric slot.

12. A user equipment (UE) for wireless communications, comprising:
    a transceiver;
    memory; and
    one or more processors communicatively coupled with the transceiver and the memory and configured to:
    identify symbols to be used by the UE to transmit a physical random access channel (PRACH) within a subframe;
    identify one or more symbols to be skipped by the PRACH within the subframe; and
    transmit, via the transceiver, the PRACH over one or more slots of the subframe based, at least in part, on the symbols to be used and the one or more symbols to be skipped,
    wherein a format of the PRACH comprises one of a plurality of PRACH formats, a number of symbols used to transmit the PRACH is dynamically variable, and the one or more symbols to be skipped by the PRACH within the subframe is based on a number of PRACH formats of the plurality of PRACH formats that fit within the one or more slots of the subframe.

13. The UE of claim 12, wherein the one or more processors are further configured to:
    identify a starting symbol for the PRACH to be transmitted over the one or more slots of the subframe; and
    wherein the transmission of the PRACH over one or more slots of the subframe is further based, at least in part, on the starting symbol for the PRACH.

14. The UE of claim 12, wherein the transmission of the PRACH over one or more slots of the subframe is further based, at least in part, on an indication that the PRACH is to overlap one or more common burst portions of the one or more slots of the subframe.

15. The UE of claim 14, wherein the one or more common burst portions includes an uplink common burst portion.

16. The UE of claim 12, wherein the identification of the symbols to be used by the UE to transmit the PRACH within the subframe is based, at least in part, on an of a PRACH collision received by the UE.

17. The UE of claim 16, wherein the indication indicates an occurrence of the PRACH collision.

18. The UE of claim 12, wherein the identification of the one or more symbols to be skipped by the PRACH within the subframe is based, at least in part, on an indication of a PRACH collision received by the UE.

19. The UE of claim 18, wherein the indication indicates an occurrence of a PRACH collision.

20. The UE of claim 12, wherein the identification of the symbols to be used by the UE to transmit the PRACH within the subframe is based, at least in part, on a first indication in a system information block (SIB), and wherein the identification of the one or more symbols to be skipped by the PRACH within the subframe is based, at least in part, on a second indication in the SIB.

* * * * *